(12) United States Patent
Ono

(10) Patent No.: US 6,239,735 B1
(45) Date of Patent: May 29, 2001

(54) MICROWAVE DETECTOR FOR THE DETECTION OF TARGET MICROWAVE FREQUENCIES BASED ON PARTITIONED BAND SWEEPING

(75) Inventor: Hisao Ono, Tokyo (JP)

(73) Assignee: Yupiteru Industries Co., Ltd. (JP)

( * ) Notice: Subject to any disclaimer, the term of this patent is extended or adjusted under 35 U.S.C. 154(b) by 0 days.

(21) Appl. No.: 09/373,459

(22) Filed: Aug. 12, 1999

(30) Foreign Application Priority Data

Aug. 31, 1998 (JP) .................................................. 10-244611

(51) Int. Cl.[7] ........................................................ G01S 7/40
(52) U.S. Cl. ................................................................ 342/20
(58) Field of Search .............................. 342/20, 111, 192

(56) References Cited

U.S. PATENT DOCUMENTS 5,268,689 * 12/1993 Ono et al. ............................... 342/20
5,389,930 * 2/1995 Ono ........................................ 342/20
5,461,383 * 10/1995 Ono et al. .............................. 342/20

\* cited by examiner

*Primary Examiner*—Daniel T. Pihulic
(74) *Attorney, Agent, or Firm*—Marger Johnson & McCollom , P.C.

(57) ABSTRACT

A microwave detector for detecting a target microwave signal carries out detection by dividing the target bandwidth into a plurality of partitioned bands which are each repeatedly swept a prescribed number of times, with the detected wave outputs from each sweep being added together to form an added detected wave output for each partitioned band, and due to mutual cancellation of the white noise, the presence of even a faint target microwave signal within a partitioned band will increase to a detectable level in the added detected wave output of such partitioned band, and because the detection process is carried out separately for each partitioned band, the microwave detector only needs enough memory capacity to store the added detected wave output of a single partitioned band.

7 Claims, 7 Drawing Sheets sweep voltage

MICROWAVE DETECTOR FOR THE DETECTION OF TARGET MICROWAVE FREQUENCIES BASED ON PARTITIONED BAND SWEEPING

BACKGROUND OF THE INVENTION

1. Field of the Invention

The present invention relates to a microwave detector for detecting microwaves emitted from measuring devices and the like, and in particular relates to a wideband microwave detector which uses a single receiver circuit to cover a wide frequency range.

2. Description of the Prior Art

Microwave detectors which generate an alarm upon detecting microwaves having the specific microwave frequencies emitted by radar type speed measurement devices are known in the prior art. Omitting a detailed description of the circuit construction, such microwave detectors generally operate by means of an antenna which picks up microwaves arriving from outside and a super-heterodyne type receiver circuit which receives microwave signals. Further, by sweeping the output frequency of the local oscillator in the related receiver circuit, such microwave detectors are able to ensure that the reception band width includes the microwave frequency of the detection target. Further, the local oscillator repeatedly carries out only a single sweep of the frequencies within the reception band width for each operation time period. Further, in the case where a voltage control type oscillator is used, such sweep can be carried out by outputting frequencies corresponding to the voltage which changes in a sawtooth pattern like that shown in FIG. 7.

At this time, if a microwave frequency within the reception band width is present, the receiver circuit outputs two peaks P within a prescribed time interval t, as shown in FIG. 8(a). Now, because the microwave frequency of the detection target is fixed for the time interval t, the presence or absence of a detection target microwave frequency can be determined by whether or not a pair of peaks P are present within the time interval t.

In reality, when no microwaves are present, a minute amount of white noise is outputted, and to deal with such white noise, a threshold value Th is established to create a margin that is sufficiently smaller than the level of the peak P, as shown in FIG. 8(a). Further, when a comparison between the output of the wave detector and the threshold value Th indicates that such output is below the threshold value Th, pulses are outputted (see FIG. 8(b)) and a judgement is carried out based on the time interval of such pulses. Further, such size relation comparison can be easily carried out by inputting the output of the wave detector and the fixed threshold value into a comparator.

In this connection, the performance of a microwave detector is determined primarily by its sensitivity. In this case, "sensitivity" refers to the ability to detect faint microwave signals.

In general, sensitivity is improved by using a high gain antenna and a high frequency circuit such as a low conversion loss mixer circuit, and by using a method which improves the performance of the devices used. However, random white noise is outputted in the wave detection output when no signals are present. Consequently, when such improvement techniques are employed, the white noise is amplified as well, and in the case where the reception level of the target microwave signal is small, the target microwave signal can be buried in the white noise, or the white noise can mistakenly be detected as the target microwave signal.

In particular, these problems associated with weak signals are common in the case where the emission source of the target microwave signal is far away, and this makes it difficult to carry out accurate detection. Namely, when the target microwave signal level is roughly the same as the white noise level, it becomes impossible to discriminate the target microwave signal and the white noise using the threshold value Th.

In other words, with prior art microwave detectors, it is difficult to detect faint microwave signals which have a level close to that of the white noise, and because this determines the detectable distance, the range of possible detection is limited.

On the other hand, in order to detect the target microwave signal as soon as possible for the benefit of the user, the detectable distance needs to be made as long as possible, and the detection of target microwave signals from far away emission sources needs to be carried out reliably. In order to solve such problem, a sweep of the same frequency range is repeatedly carried out, and by adding the detection outputs of each sweep cycle, it becomes possible to extract target microwave signals buried in white noise. Namely, because the white noise occurs at random, mutual cancellation will occur as the detection outputs from each sweep cycle are added together. However, because the target microwave signal possesses a specific frequency characteristic, the target microwave signal will be amplified as the detection outputs from each sweep cycle are added together. In this way, it is possible to extract microwave signals that are buried in white noise.

However, in order to carry out this operation, the detection output from each sweep cycle needs to be stored in memory, and then an adding process needs to be carried out. Moreover, in this arrangement the memory capacity must be capable of storing the entire detection output based on one sweep. Consequently, a large memory capacity is required, and this leads to high costs.

Furthermore, in such an arrangement where the entire frequency range is swept a plurality of times to obtain detected wave outputs which are then added together to extract the target microwave signal, the detection of the target microwave signal is not possible without a plurality of sweeps, and this results in poor responsibility.

Moreover, the detected wave outputs undergo signal processing after being converted to digital signals by an A/D converter. Accordingly, the use of a high resolution A/D converter is required in order to improve accuracy. In this regard, it is possible to detect a large amount of data within a shortened sampling time, but if the sampling time is shortened, the amount of data that is detected and stored as digital data is increased, and this further complicates the problems described above.

SUMMARY OF THE INVENTION

With a view toward overcoming the problems of the prior art described above, it is an object of the present invention to provide a microwave detector having a high sensitivity and excellent responsibility which makes it possible to reduce the memory capacity required for data processing of the sampled detected wave outputs even when utilizing a microcomputer having a relatively slow processing speed.

In order to accomplish the object stated above, the microwave detector according to the present invention includes a super-heterodyne type receiving means for repeatedly carrying out reception operations for prescribed target bands established in the microwave frequency range, in which the target bands are divided into a plurality of partitioned bands which separately undergo a plurality of repeated sweeps; detection means for detecting microwave signals within the detection target frequency based on the detected wave outputs outputted from the reception means; and alarm means to output an alarm when a detection target microwave signal is detected by the detection means. Further, the detection means is equipped with an adding means for adding each of the detected wave outputs obtained from the repeated sweeps of the partitioned bands, storage means for storing the added detected wave outputs added by the adding means, and judgement means for judging the presence or absence of detection target microwave signals based on the added detected wave outputs (claim 1).

With the operations of the microwave detector arranged in this way, each of the detected wave outputs for a particular partitioned band obtained by the respective plurality of sweeps thereof are added together to form an added detected wave output. Accordingly, due to mutual cancellation, the level of white noise in the added detected wave output becomes lower. On the other hand, in the case where a detection target microwave signal is present in the partitioned band being searched, the level of such target microwave signal will become higher in the added detected wave output. As a result, even when the level of a target microwave signal is low within a detected wave output obtained by a single sweep, the level of such target microwave signal will increase in the added detected wave output to a level that can be reliably detected. Further, by separately carrying out sweeps of each partitioned band, the microwave detector only needs enough memory capacity to store the added detected wave output of a single partitioned band (i.e., the microwave detector does not need to store detected wave outputs for the entire target bandwidth), and this makes it possible to reduce the amount of memory capacity required by the microwave detector.

Preferably, the reception means is also provided with a reception function for carrying out a single wideband sweep through a frequency range wider than a partitioned band, and the detection means is also provided with a judgement function for judging the present or absence of a target microwave signal based on the detected wave output obtained from the single wideband sweep (claim 2).

With such arrangement, because a microwave detection process is also carried out based on a single wideband sweep, it becomes possible to quickly detect the present of a target microwave signal. Thus, in the case where the level of the target microwave signal is relatively high in the detected wave output, a reliable detection can be carried out in the same manner as that performed in the prior art.

Further, it is also preferred that the number of repeated sweeps be different for each partitioned band (claim 3). Namely, because the probability of finding a target microwave signal in the target bandwidth is not uniform throughout the partitioned bands, by repeatedly sweeping the partitioned band having a high probability of possessing a target microwave signal a relatively large number of times, it becomes possible to carry out a reliable detection process. Further, by repeatedly sweeping the partitioned band having a low probability of possessing a target microwave signal a relatively small number of times, it becomes possible to efficiently carry out a rapid detection process.

Further, it is also preferred that the middle partitioned band of the target bandwidth be searched more frequently than the other partitioned bands (claim 4). This is due to the fact that the middle region of the target bandwidth usually has a higher probability of possessing a target microwave signal. Accordingly, by searching the middle partitioned band more frequently than the other partitioned bands, it becomes possible to efficiently carry out reliable detection of a target microwave signal.

BRIEF DESCRIPTION OF THE DRAWINGS

FIG. 3(*b*) shows an example of a sweep voltage inputted into the VCO.

FIG. 8(*b*) is an illustration for describing the process of judging the absence or presence of a target microwave signal based on the output of the wave detector.

DETAILED DESCRIPTION OF THE PREFERRED EMBODIMENTS

Figure 1:
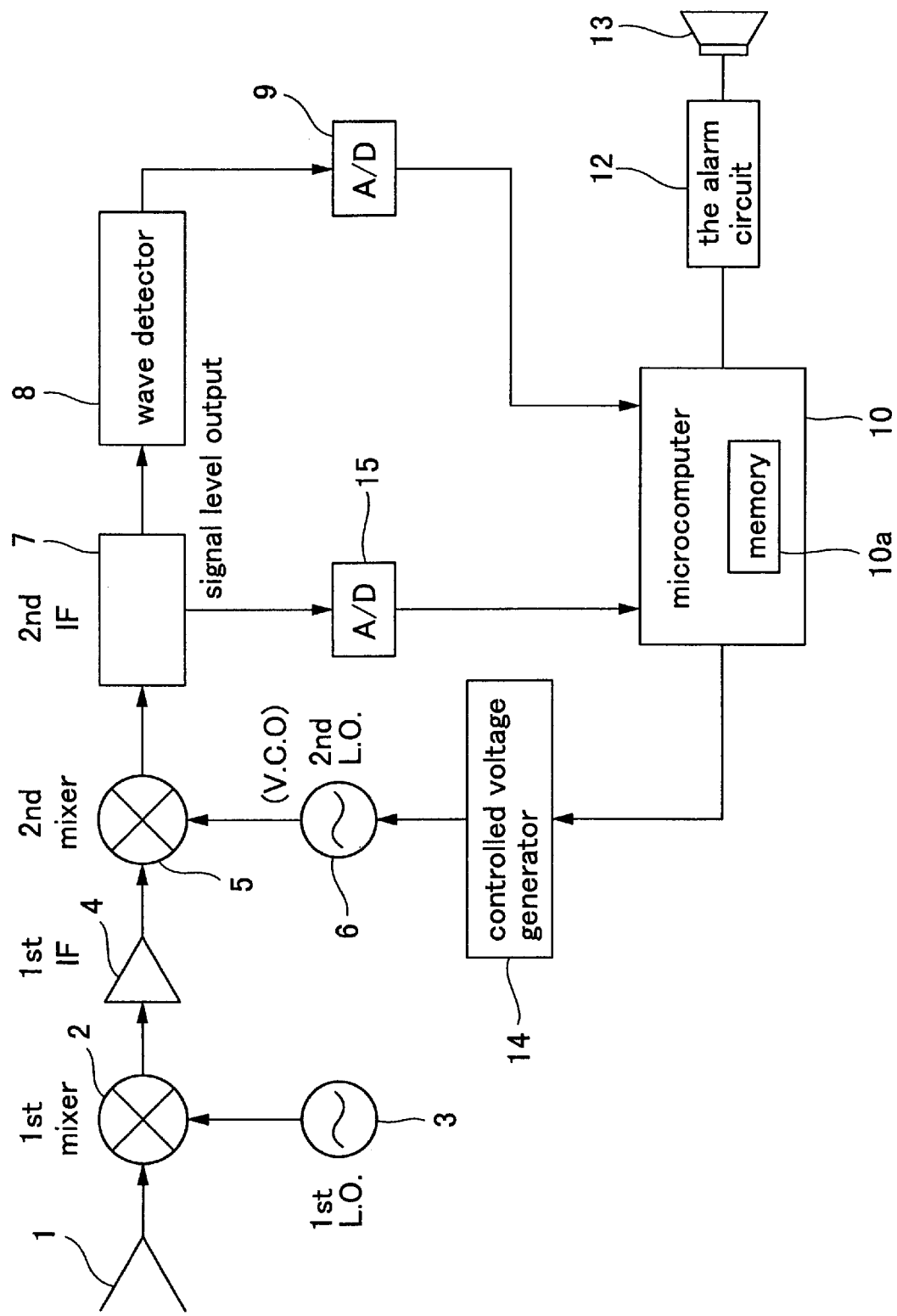
FIG. 1 is a block diagram showing the overall structure of the preferred embodiment of a microwave detector according to the present invention.

FIG. 1 shows the overall structure of the preferred embodiment of a microwave detector according to the present invention. This structure will be described with respect to a double super-heterodyne receiver system. As shown in FIG. 1, microwaves from outside are picked up by a horn antenna 1 and mixed in a first mixer 2 with the output from a first local oscillator 3.

The mixed output of the first mixer 2 is inputted into to a second mixer 5 via a first intermediate frequency amplifier 4, and undergoes frequency mixing with the output of a second local oscillator 6. The second local oscillator 6 comprises a voltage controlled variable frequency oscillator (VCO), and as will be described below, control is carried out by generating a sawtooth or triangular voltage waveform within a prescribed frequency range by means of a controlled voltage generator 14.

The mixed output from the second mixer 5 is inputted into a wave detector 8 via a second intermediate frequency amplifier 7. Then, after the detected wave signal outputted from the wave detector 8 is sampled and converted into digital data by an A/D converter 9, such digital data is inputted into a microcomputer 10. Next, based on such received detected wave data, the microcomputer 10 carries out a judgement to determine whether or not a target microwave signal has been received, and in the case where it is judged that a target microwave signal has been received, a detection signal is outputted to an alarm circuit 12. Further, the microcomputer 10 includes an internal memory 10*a* for storing data based on the received detected wave signals, and this data stored in the memory 10*a* is used for carrying out the judgement for determining whether or not a target microwave signal has been received.

Now, when the alarm circuit 12 receives a detection signal from the microcomputer 10, an alarm device 13 is activated to notify the driver. In this regard, the alarm device 13 may be a sound-emitting device such as a buzzer or alarm, a visual device such as a warning lamp, or a combination of a plurality of alarm means.

Further, the microcomputer outputs a control signal to the controlled voltage generator 14, and when this control signal is received, the controlled voltage generator 14 generates a controlled voltage for sweeping within a prescribed voltage range.

Figure 2:
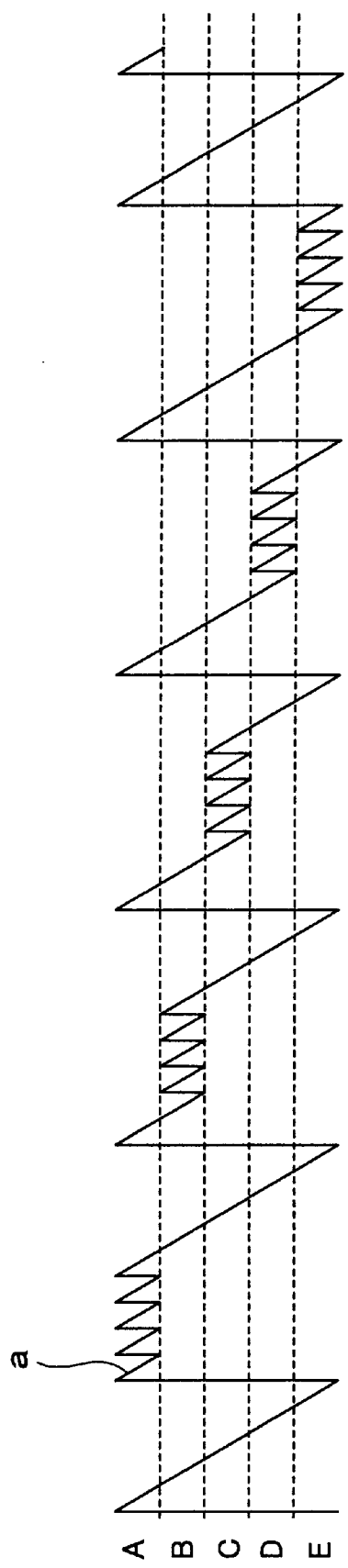
FIG. 2 illustrates the relationship between the partitioned bands and the sweep voltage.

As shown in FIG. 2, in the present embodiment the observed band is divided into a plurality of partitioned bands A~E (i.e., in the present embodiment the observed band is divided into five partitioned bands). In this regard, a sweep of a single partitioned band is repeated a plurality of times, and the detected wave signals obtained from each sweep are integrated and stored in the memory 10a. Then, based on the integrated value of the detected wave signals obtained from the prescribed number of repeated sweeps, a judgement is carried out to determine whether a target microwave signal is present or absent.

Namely, as shown in FIG. 3(a), even in the case where a target microwave signal P is so faint that it can not be discriminated from white noise, if the same partitioned band is repeatedly swept a plurality of times, the random white noise will be mutually canceled, but the target microwave signal portions will add together. In this way, as shown in FIG. 8(a), the level of the target microwave signal portion will become larger than the other regions, thereby making it possible to discriminate the target microwave signal portion.

Further, in with the present embodiment, because the memory 10a only needs a storage capacity capable of storing the detected wave output of a single partitioned band, such arrangement needs less storage capacity than arrangements that require storage of the detected wave output of the entire bandwidth. In the present embodiment, because the bandwidth is divided into five partitioned bands having the same width, the required memory capacity is reduced to ⅕.

Furthermore, in the present embodiment, after a sweep has been repeated a prescribed number of times for each partitioned band in a prescribed order, a judgement is carried out to determine whether a target microwave signal is present or absent from each partitioned band. Now, it should be noted that a certain amount of time is required to carry out judgements in this way for all the partitioned bands. In this regard, as shown in FIG. 2, after one partitioned band as been swept the prescribed number of times and been searched, a single sweep over the entire bandwidth (i.e., partitioned bands A~E) is carried out before the next partitioned band undergoes a repeated sweep. In this way, a normal detection process is carried out based on this single wide sweep through the entire bandwidth. In this regard, the controlled voltage for such wide sweep is set at a level lower than that used for the current partitioned band.

With the sweeping operations arranged as described above, by sweeping each partitioned band a plurality of times, it becomes possible to carry out reliable detection even when the level of the target microwave signal is low, and by carrying out the single wide sweep through the entire bandwidth, it becomes possible to quickly detect a target microwave signal when the level of such target microwave signal is relatively high. Accordingly, in the present embodiment, accurate detection is achieved by the repeated sweeps of each partitioned band, and quick detection is achieved by the single wide sweep through the entire bandwidth which is carried out between the partitioned bands.

Further, the signal strength that is outputted from the second intermediate frequency amplifier 7 is sent to the microcomputer 10 via an A/D converter 15. Then, various processes (which are the same as those in the prior art and therefore do not need to be described in detail) are carried out based on such signal strength.

Figure 4:
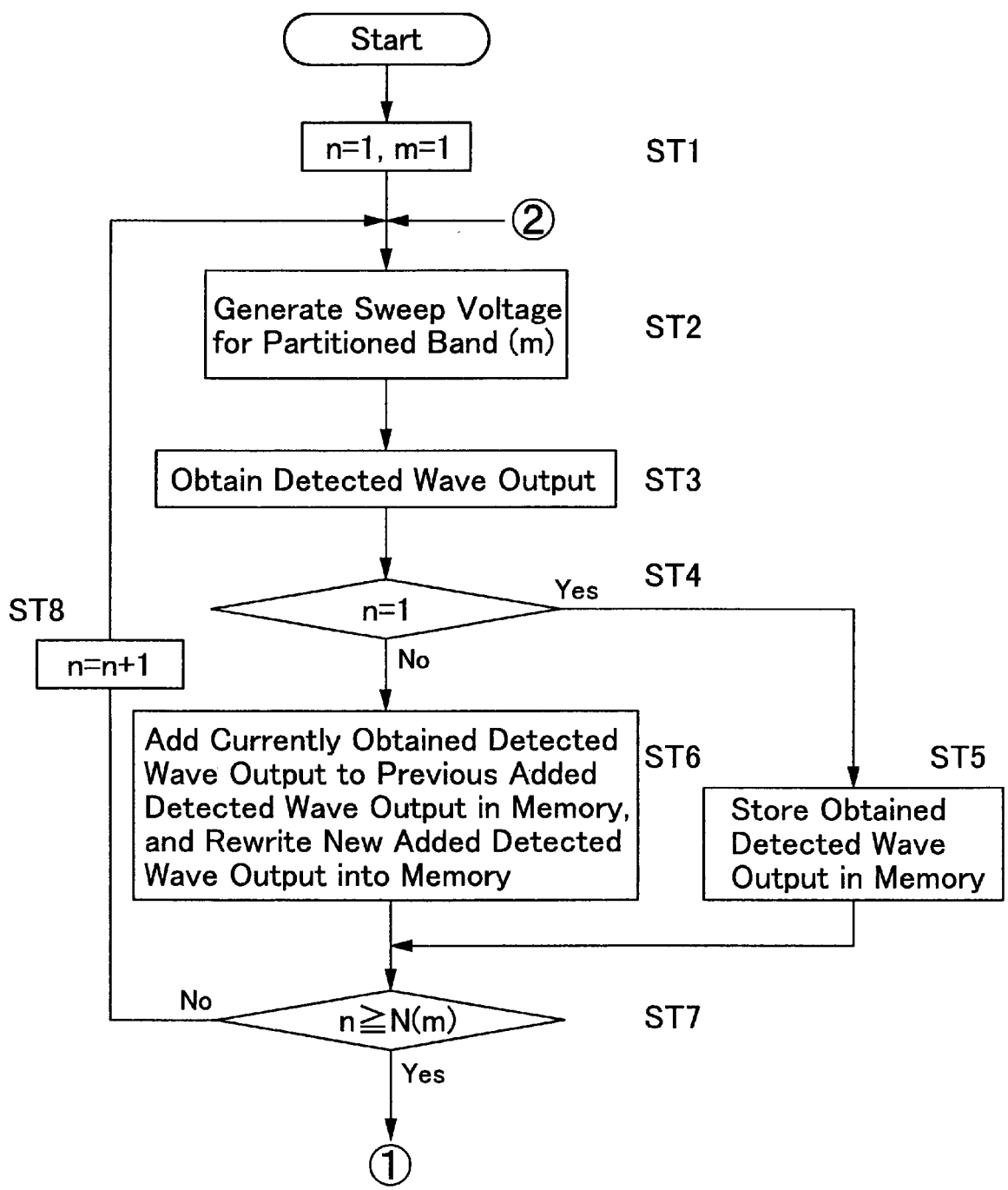
FIG. 4 is the first part of a flow chart describing the operations carried out by the microcomputer.

Next, with reference to the flow chart shown in FIGS. 4 and 5, a detailed description will be given for the operations carried out by the microcomputer 10 in the present embodiment. First, as shown in FIG. 4, the variables n and m are both given an initial value 1 (ST1). In this regard, the variable n represents the number of times a sweep is repeated in a partitioned band, and the variable m represents the number of a partitioned band. For the partitioned arrangement shown in FIG. 2, m=1 for the partitioned band A, m=2 for the partitioned band B, m=3 for the partitioned band C, m=4 for the partitioned band D, and m=5 for the partitioned band E.

Next, a control signal for generating a sweep voltage for partitioned band (m) is outputted (ST2). At this initial point, because m=1, a sweep is carried out for the first partitioned band (i.e., partitioned band A in FIG. 2). In accordance with this control signal, the controlled voltage generator 14 sweeps the output voltage within a prescribed range, and in accordance with such operation, the frequency of the output signal of the second local oscillator 6 is also swept.

Next, a detected wave output is obtained (ST3). Now, in the case where the obtained detected wave output is the first detected wave output for a particular partitioned band, because a "YES" judgement is made at Step 4, the operations will proceed to Step 5. At this point, the obtained detected wave output is stored in the memory 10a, and the stored data is rewritten. On the other hand, in the case where the detected wave output is obtained from the second sweep, a "NO" judgement is made at Step 4 and the operations proceed to Step 6, and at this point the added detected wave output for the same partitioned band stored in the memory 10a is read out and added to the newly obtained detected wave output to create a new added detected wave output, and then this new added detected wave output is rewritten into memory 10a to form the newest data.

Next, a judgement is carried out to determine whether or not the current value of n for the particular partitioned band being swept has reached a prescribed repetition value N(m) (ST7), and if n is less than N(m), the value of n is raised by one increment (ST8), and then the operations return to Step 2. In this way, the process described above is repeated until a sweep has been carried out the prescribed number of times established for the particular partitioned band.

Figure 8:
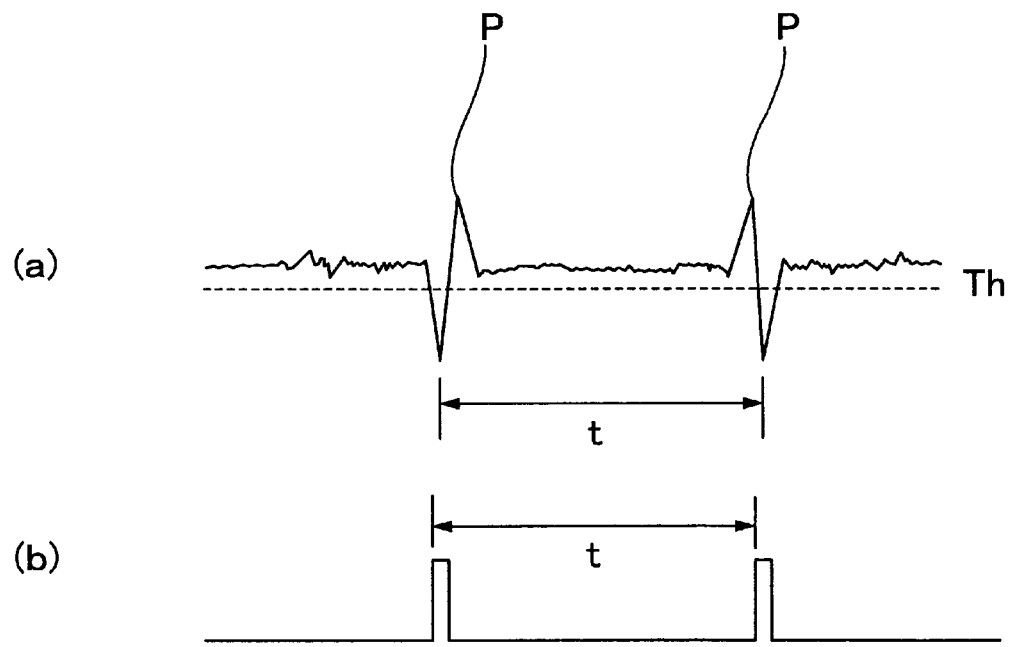
FIG. 8(*a*) shows an example of a wave detector output.

On the other hand, in the case where the prescribed number of sweeps has been carried out, a "YES" judgement is made at Step 7 and the operations proceed to Step 9, at which point a judgement is carried out to determine whether or not a target microwave signal has been received. Namely, the added detected wave output stored in the memory 10a is read out, and then a judgement is carried out to determine whether or not a pair of output signal peaks like that shown in FIG. 8 is present.

Now, in the case where a target microwave signal is present, a detection signal is outputted to the alarm circuit 12 (ST10). On the other hand, in the case where a target microwave signal is not present, the operations proceed from Step 9 to Step 11, and a control signal for generating a wide range sweep voltage is outputted. In this case, because only a single sweep is carried out based on such control signal, the detected wave output is obtained and used in carrying out a judgement to determine whether or not a target microwave is present (ST12). In this regard, such judgement based on a single detected wave output is basically the same as that performed in prior art detectors. Now, in the case where a target microwave signal is present, the operations proceed to Step 10, and a detection signal is outputted.

On the other hand, in the case where a target microwave signal is not present, the operations proceed to Step 13, and a judgement is carried out to determine whether or not the current value of the variable m has reached the maximum value M assigned to the partitioned bands (ST13), and in the case where the value M has been reached (i.e., after the process described above has been carried out sequentially for all the partitioned bands), the operations return to Step 1 and the values of n and m are reset to 1, and then the process described above is repeated from the beginning. Now, in the case where m is less than M, the value of m is raised by one increment (ST14), and then after the operations return to Step 2, the process described above is carried out for the next partitioned band.

Incidentally, in the operations described above, after the detected wave output is obtained at Step 3, a judgement is carried out at Step 4 to determine whether or not such detected wave output is the first detected wave output, and then based on the results of such judgement, the process for storing the detected wave output in memory is changed. If this were the actual way the operations were carried out, the first detected wave output would need to be held temporarily in a buffer. However, the description given above was for the sake of convenience, and the judgement step that is actually carried out is used to determine whether or not a sweep of a particular partitioned band is the first sweep. In the case where the current sweep is the first sweep, the detected wave output that is outputted from the A/D converter 9 over the sampling time is obtained and stored in the memory 10a. On the other hand, in the case where the current sweep is the second or larger order sweep, the detected wave output that is outputted from the A/D converter 9 over the sampling time is obtained and added to the data previously stored for the related partitioned band to create a new added detected wave output, and then this new added detected wave output is rewritten into the memory 10a to form the newest data for the related partitioned band. In this way, there is no need for a buffer, and this makes it possible to construct a compact microwave detector.

Figure 3:
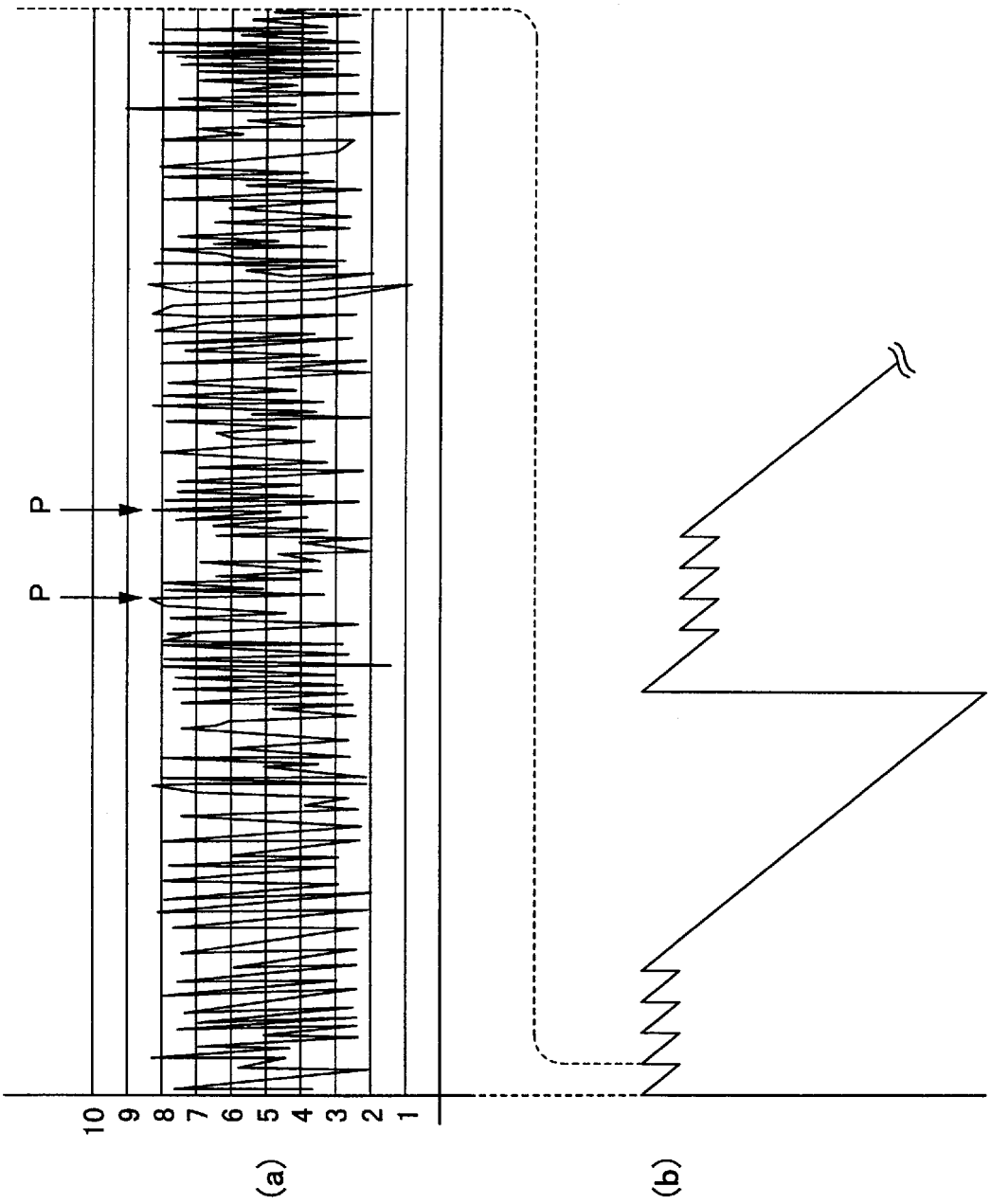
FIG. 3(*a*) shows an example of a detected wave output for one partitioned band.

Now, as shown in FIG. 3, there are many cases where a normal detected wave output has an entire positive value. In response to such situation, when such detected wave output is processed by the microcomputer 10, a value of 0 is assigned to the middle voltage level (i.e., the level indicated by "5" in FIG. 3), with all higher voltage values being processed as positive values, and all lower voltage values being processed as negative values. In this way, in addition to making the white noise converge around 0, such processing method makes it possible to prevent the added data from reaching a large value. In other words, it becomes possible to reduce the memory capacity, and the establishment of a threshold value becomes easy.

Figure 5:
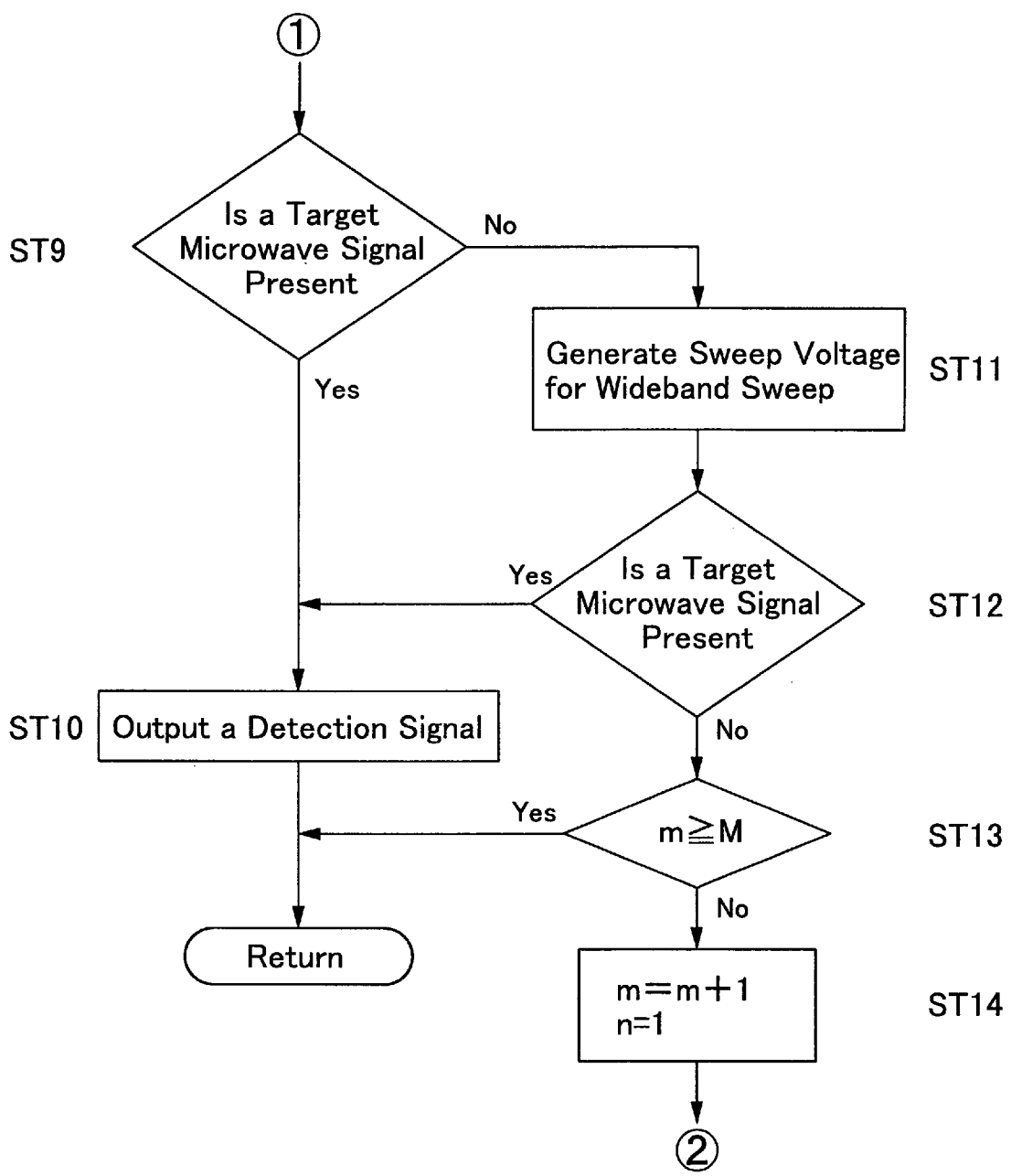
FIG. 5 is the second part of a flow chart describing the operations carried out by the microcomputer.

Furthermore, even though the process that is carried out for the first sweep was described in the flow chart of FIGS. 4 and 5 as being different from the process that is carried out for the second and larger order sweeps, if the stored data in the memory 10a is cleared to 0 before the first sweep of each partitioned band, it becomes possible to carry out the process at Step 6 for the detected wave output based on the first sweep. In other words, it becomes possible to carry out the same process for the detected wave outputs from all the sweeps.

Moreover, even though the example in the drawings shows the first partitioned band A being swept 5 time and the other partitioned bands B~E each being swept 4 times, the present embodiment is not limited to such numbers, and each partitioned band may be swept the same number of times or a different number of times. For example, in the case where a different number of sweeps will be used, the partitioned bands having a high probability of possessing a target microwave signal can be swept a relatively large number of times, while the partitioned bands having a low probability of possessing a target microwave signal can be swept a relatively small number of times in order to efficiently carry out a highly accurate search.

Figure 6:
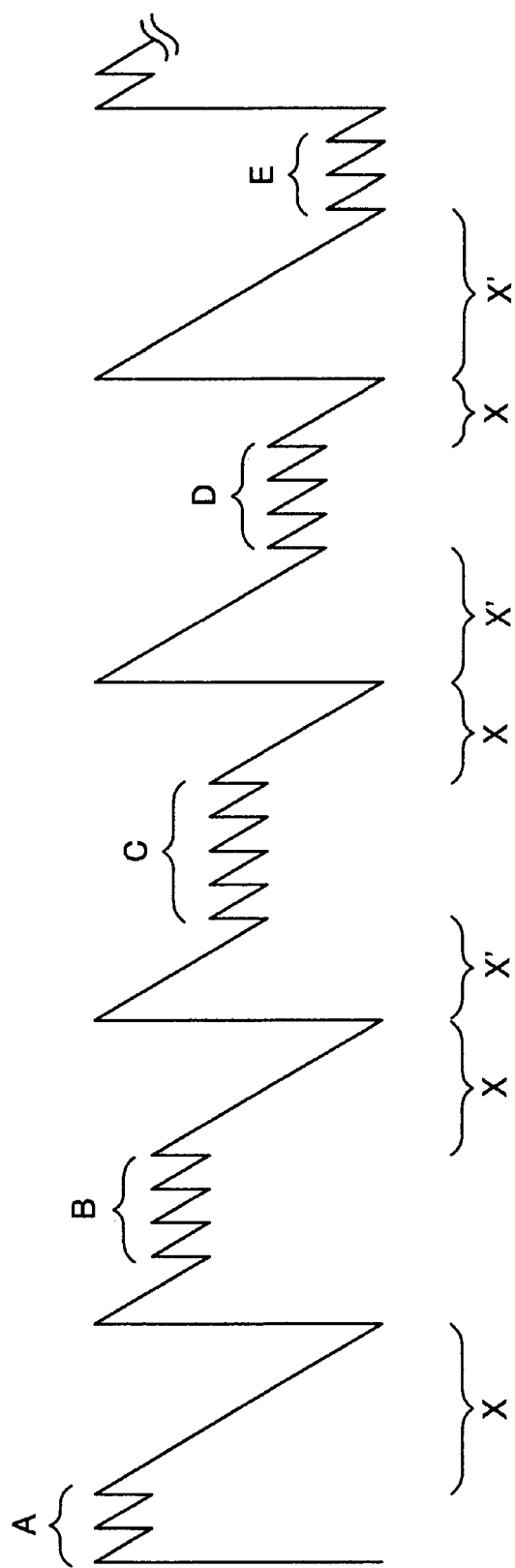
FIG. 6 illustrates an example of a sweeping operation carried out by the microwave detector according to the present invention.
Figure 7:
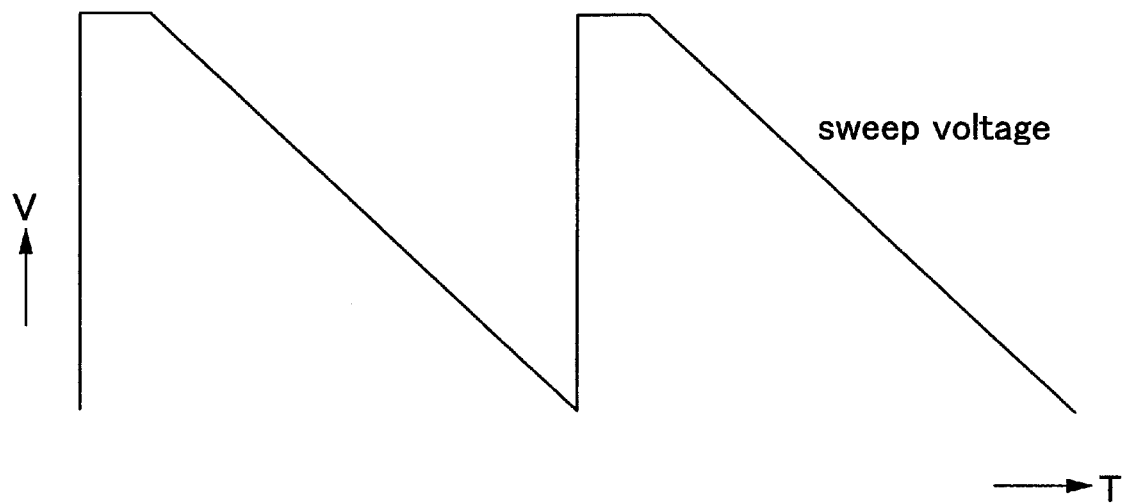
FIG. 7 is an illustration used in describing the sweep voltage inputted into the controlled voltage generator and the detected wave output.

In this regard, FIG. 6 shows the kind of process that can be carried out for the case where the middle partitioned band C has a high probability of possessing a target microwave signal. As shown in FIG. 6, three sweeps are carried out for each of the partitioned bands A and E, four sweeps are carried out for each of the partitioned bands B and D, and five sweeps are carried out for the middle partitioned band C. Further, the wideband sweep may be carried out over the region X which descends from the previous partitioned band or the region X' which descends toward the next partitioned band. Moreover, it is possible to use both regions X and X' or only one of the regions X and X', or it is possible to select the region X or X' in accordance with the particular pair of partitioned bands. For example, the region X may be used for the wideband sweep between the partitioned bands A and B, the region X' may be used for the wideband sweep between the partitioned bands D and E, and either the region X or the region X' may be used for the wideband sweeps between the partitioned bands B and C and between the partitioned bands C and D.

Furthermore, the order in which the partitioned bands are searched is not limited to the order described above, and it is possible to use any desired order. Further, the number of times each partitioned band is searched does not need to be carried out uniformly. For example, in the case where the middle partitioned band C has a high probability of possessing a target microwave signal, it is possible to search the middle partitioned band C more frequently than the other partitioned bands. An example order for such situation would be "A→C→B→C→D→C→E→C", in which the middle partitioned band C is searched after each search of one of the other partitioned bands. Of course, the order of such search is not limited to this, and it is possible to change the number of times each partitioned band is searched. For example, the middle partitioned band C can be searched the greatest number of times, the partitioned bands B and D can be searched fewer times than the middle partitioned band C, and the partitioned bands A and E can be searched fewer times than the partitioned bands B and D.

Further, by simultaneously carrying out adjustment of the number of times each partitioned band will be searched and adjustment of the number of sweeps carried out for each partitioned band, it becomes possible to efficiently carry out accurate detection of target microwave signals.

Now, even though only one bandwidth was described in the present embodiment as being divided into a plurality of partitioned bands, the present invention is not limited to this arrangement, and it is possible to apply the present invention to a plurality of bandwidths. Namely, even though a specific example is omitted from the drawings, when a plurality of bandwidths is to be searched, each bandwidth is first divided into a plurality of partitioned bands, and then a search is conducted through the partitioned bands of each bandwidth.

Further, in the case where a plurality of bandwidths such as the X band, K band and Ka band are to be searched, because a different sensitivity is required for each bandwidth, by setting the number of sweeps in accordance with such requirements, it becomes possible to maintain accuracy while reducing wasted time, and this makes it possible to rapidly detect target microwave signals. For example, because the level of a K band microwave signal is low, it would be appropriate to use a relatively large number of sweeps when searching the K band.

Now, in the microwave detector according to the present invention described above, the target band (e.g., the X band, K band or Ka band) is divided into a plurality of partitioned bands which are each repeatedly swept a plurality of times, with the detected wave outputs from each sweep being added together to form an added detected wave output for each partitioned band, and this adding operation creates mutual cancellations which lower the level of white noise. Accordingly, even if a target microwave signal has a low level within a single detected wave output, because the level of such target microwave signal will be increased in the added detected wave output, an accurate detection can be carried out reliably. Further, because the repeated sweeping operation is carried out separately for each partitioned band, the storage means only needs enough storage capacity for storing the detected wave output of a single partitioned band, and this makes it possible to reduce the required memory capacity.

Furthermore, by carrying out a single wideband sweep as described in claim 2, it becomes possible to quickly detect the presence of a target microwave signal having a relatively high level based on the detected wave output from such single wideband sweep.

Moreover, by changing the number of sweeps for each partitioned band as described in claim 3, and by changing the number of times each partitioned band is searched as described in claim 4, it becomes possible to efficiently carry out an accurate detection process.

What is claimed is:

1. A microwave detector for the detection of target microwave frequencies based on partitioned band sweeping comprising:

super-heterodyne type receiving means for repeatedly carrying out reception operations over a plurality of target bandwidths established in the microwave frequency range, the receiving means including means for dividing each target bandwidth into a plurality of partitioned bands which are separately swept a prescribed number of times;

detecting means for detecting a target microwave signal based on detected wave outputs outputted from the receiving means, the detecting means including adding means for adding the detected wave outputs obtained from the prescribed number of sweeps to create an added detected wave output for each partitioned band, storage means for storing the added detected wave output of each partitioned band, and judgement means for judging the presence or absence of a target microwave signal based on the added detected wave output of each partitioned band; and alarm means for outputting an alarm when the detection means detects a target microwave signal.

2. The microwave detector for the detection of target microwave frequencies based on partitioned band sweeping of claim 1, wherein the reception means is adapted to also carry out a single sweep through the target bandwidths, and wherein the judgement means of the detection means is adapted to also judge the presence or absence of a target microwave signal based on the detected wave output outputted from the receiving means for each single sweep of a target bandwidth.

3. The microwave detector for the detection of target microwave frequencies based on partitioned band sweeping of claim 1, wherein a prescribed number of sweeps is separately established for each partitioned band.

4. The microwave detector for the detection of target microwave frequencies based on partitioned band sweeping of claim 2, wherein a prescribed number of sweeps is separately established for each partitioned band.

5. The microwave detector for the detection of target microwave frequencies based on partitioned band sweeping of claim 1, in which the plurality of partitioned bands includes a middle partitioned band, wherein the receiving means is adapted to search the middle partitioned band more frequently than the other partitioned bands.

6. The microwave detector for the detection of target microwave frequencies based on partitioned band sweeping of claim 2, in which the plurality of partitioned bands includes a middle partitioned band, wherein the receiving means is adapted to search the middle partitioned band more frequently than the other partitioned bands.

7. The microwave detector for the detection of target microwave frequencies based on partitioned band sweeping of claim 3, in which the plurality of partitioned bands includes a middle partitioned band, wherein the receiving means is adapted to search the middle partitioned band more frequently than the other partitioned bands.

* * * * *